United States Patent

Lamm

[15] 3,703,163
[45] Nov. 21, 1972

[54] ROTARY PISTON INTERNAL COMBUSTION ENGINE

[72] Inventor: Heinz Lamm, Esslingen-St. Bernhardt, Germany

[73] Assignee: Daimler-Benz Aktiengesellschaft, Stuttgart-Untertuerkheim, Germany

[22] Filed: May 15, 1970

[21] Appl. No.: 37,671

[30] Foreign Application Priority Data

May 17, 1969 Germany..........P 19 25 174.2

[52] U.S. Cl..............................123/8.09, 123/148 C
[51] Int. Cl..............................................F02b 53/12
[58] Field of Search.................123/8.05, 148 C, 8.09

[56] References Cited

UNITED STATES PATENTS

| | | | |
|---|---|---|---|
| 3,534,717 | 10/1970 | Froede | 123/8.05 |
| 3,452,725 | 7/1969 | Kelly | 123/8.05 |
| 3,554,092 | 1/1971 | Shibagaki | 123/148 C X |
| 3,359,955 | 12/1967 | Turner | 123/8.05 |
| 2,025,203 | 12/1935 | Harper | 123/148 C |

*Primary Examiner*—Allan D. Hermann
*Attorney*—Craig, Antonelli & Hill

[57] ABSTRACT

A rotary piston internal combustion engine particularly of trochoidal construction which has a rotating piston that slides along the running surface of the casing and which includes several spark plugs in the running surface of the casing which are arranged adjacent one another in the axial direction of the casing.

13 Claims, 3 Drawing Figures

PATENTED NOV 21 1972 3,703,163
FIG. 1
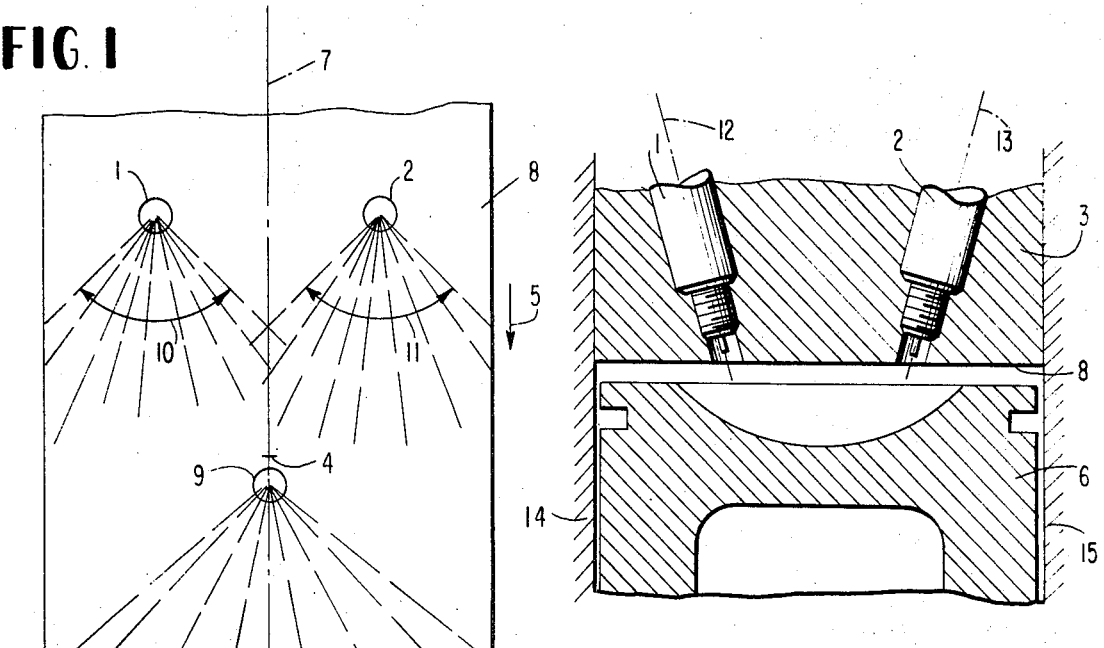
FIG. 2
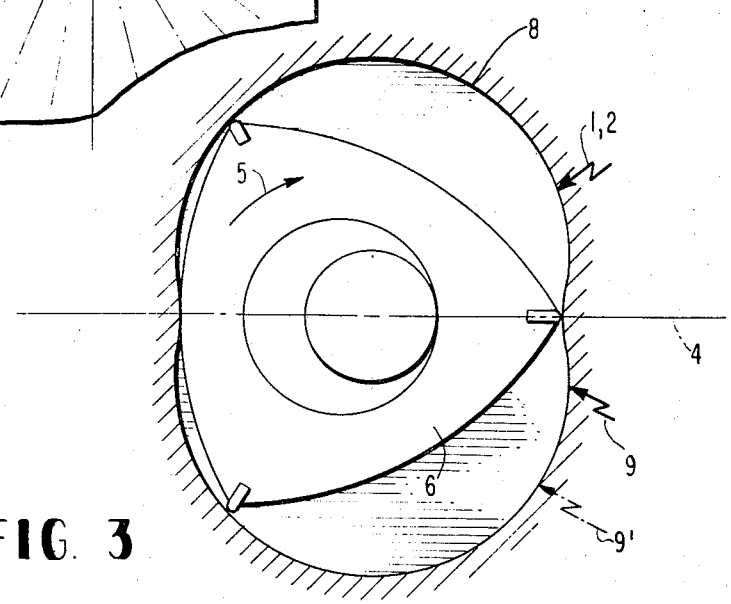
FIG. 3

ROTARY PISTON INTERNAL COMBUSTION ENGINE

The present invention relates to a rotary piston internal combustion engine especially of trochoidal-type of construction with a rotating piston which slides along the running or contact surface of the casing, and with several spark plugs at the running or contact surface of the casing.

In the hitherto customary types of construction of the rotary piston internal combustion engines, the "single ignition" has been utilized inter alia. A spark plug was arranged in the center of the casing in front of, i.e., upstream of the minor axis in the relatively cold arc. With further experience, it has been confirmed that the flame expands primarily only in the direction of rotation of the piston and some portions of the combustion space are not seized or covered sufficiently rapidly. A further spark plug was therefore arranged behind or downstream of the minor axis in the relatively hot arc, and this type of construction is commonly referred to as "double ignition." It was significant that both spark plugs of such prior art arrangements were located in the center of the contact or running surface of the casing.

The present invention is concerned with the task to accelerate especially in the axial direction the expansion of the ignition flame, primarily in connection with wide rotary pistons.

This is achieved according to the present invention in that at least two spark plugs are arranged adjacent one another in the axial direction of the casing.

It has been discovered that an angle is delineated on the contact or running surface of the casing beginning from the firing channel of the spark plug in the direction of rotation of the piston, which angle characterizes the flame propagation or expansion and the temperature progress. Consequently, the arrangement of the spark plug according to the present invention is of advantage since the flame angles of the individual spark plugs intersect already after a short distance in the direction of rotation of the piston. As a result thereof, the entire width of the casing is seized or covered more rapidly by the ignition flame; the temperature progress becomes more uniform and as a result thereof, the warping of the casing becomes smaller, which has as a consequence an increased gas-tightness.

According to a preferred type of construction in accordance with the present invention, the spark plugs may be arranged advantageously in the direction of rotation of the piston ahead of, i.e., upstream of the minor axis still in the cold arc.

A further feature of the present invention essentially resides in that the longitudinal axes of the spark plugs intersect one another at an acute angle on the inside of the casing.

The present invention proposes for the arrangement of the spark plugs that the spark plugs be arranged at an acute angle to the contact surface of the casing so that the longitudinal axes thereof are inclined in the direction of rotation of the piston.

Furthermore, according to the present invention, at least one spark plug may be arranged additionally behind, i.e., downstream of the minor axis in the direction of rotation of the piston in the hot arc in the center of the contact or running surface of the casing, preferably disposed one behind the other.

The coverage of the entire width of the casing by the ignition flame is achieved in this manner more advantageously. A more rapid through-ignition with a more steep pressure increase takes place and an ignition delay is far-reachingly precluded. A gain in average effective pressure and a decrease of the specific consumption will be noted. Furthermore, a smaller ignition delay results in a smaller advanced or early ignition angle, i.e., a greater safety against knocking of the engine. An increase of the compression with simultaneous decrease of the specific fuel consumption is possible thereby, or one realizes with the same compression a greater certainty against knocking, i.e., a fuel with a lower octane rating can be used. The combustion efficiency is improved with a smaller ignition delay which has as a consequence lower exhaust temperatures and an increase of the efficiency factor. The hydrocarbon components in the exhaust gas are reduced.

Last, but not least, a more uniform temperature distribution results also for the radial sealing bars. As a result thereof, smaller plays of the sealing bars are possible and the lateral and radial gas-tightness at the sealing bar is increased because a lesser warping of the sealing bar is assured by the uniform temperature distribution. Thus, also an increase of the average effective pressure and a decrease of the specific fuel consumption result from this advantage.

A gas-tight engine results in smaller temperatures both at the sealing bar as also at the trochoidal running or contact surface. A good lubrication between sealing bar and trochoidal running or contact surface is assured thereby, connected with lesser wear. Also, lower spark plug temperatures result therefrom, i.e., spark plugs with a smaller thermal value can be used, and the danger of soiling of the spark plugs is decreased.

With an arrangement of several spark plugs, the voltage requirement is lowered, and a better ignition--also in case of damp spark plug or at low external atmospheric temperatures--is possible. The lead-coating of the spark plug is reduced thereby: a short-circuit formation is lessened, and the spark surface leakage path at the ignition spark plug is longer.

Finally, it should be pointed out that the operating safety increases with the number of spark plugs.

A possibility for the additional mounting of one or several spark plugs resides in that the additional spark plug or spark plugs are arranged at an acute angle to the running or contact surface of the casing so that the longitudinal axis or axes thereof is or are inclined opposite the direction of rotation of the piston.

Accordingly, it is an object of the present invention to provide a rotary piston internal combustion engine of the type described above which avoids the aforementioned shortcomings and drawbacks encountered in the prior art.

Another object of the present invention resides in a rotary piston internal combustion engine which accelerates the spreading of the ignition flame, particularly in the axial direction while assuring a more rapid coverage of the entire width of the casing by the ignition flame.

A further object of the present invention resides in a rotary piston internal combustion engine which is characterized by a more uniform temperature development and thus with lesser warping of the casing and/or sealing bars.

Still a further object of the present invention resides in a rotary piston internal combustion engine which attains a gain in average effective pressure and a decrease in specific fuel consumption.

A further object of the present invention resides in a rotary piston internal combustion engine which not only improves the combustion efficiency thereof but also reduces the danger of knocking.

Still a further object of the present invention resides in a rotary piston internal combustion engine which improves the length of life of the spark plugs while rendering more simple the ignition system.

These and further objects, features, and advantages of the present invention will become more obvious from the following description when taken in connection with the accompanying drawing which shows, for purposes of illustration only, several embodiments in accordance with the present invention, and wherein:

FIG. 1 is a partial schematic plan view on a part of a contact or running surface of the casing of a rotary piston internal combustion engine with the arrangement of three spark plugs in accordance with the present invention;

FIG. 2 is a partial cross-sectional view through the contact or running surface of the casing and of a piston with two spark plugs disposed adjacent one another; and FIG. 3 is a schematic view of the contact or running surface of the casing with the arrangement of three spark plugs in accordance with the present invention.

Referring now to the drawing wherein like reference numerals are used throughout the various views to designate like parts, and more particularly to FIG. 1, two spark plugs 1 and 2 are arranged in this embodiment adjacent one another in the axial direction of a casing 3 at some distance in front of, i.e., upstream of minor axis 4 (FIG. 3) of the rotary piston internal combustion engine, otherwise of conventional construction. Shortly behind, i.e., downstream of the minor axis 4, as viewed in the direction of rotation 5 of the piston 6 (FIG. 2), is disposed a third spark plug 9 along the center line 7 of the running surface 8 of the casing 3. The flame angles 10 and 11 of the spark plugs 1 and 2 intersect within the area of the center line 7.

According to FIG. 2, two spark plugs 1 and 2 are so mounted in the casing 3 that the axes 12 and 13 thereof intersect on the inside of the casing 3. Furthermore, the piston 6 and the lateral parts 14 and 15 of the housing are indicated in this drawing.

It can be readily seen from FIG. 3 that the spark plugs 1 and 2 point in the direction of rotation 5 of the piston 6 whereas the third spark plug 9 is inclined in a direction opposite to the direction of rotation of the piston. The running surface 8 of the casing 3 and the minor axis 4 are also schematically indicated in this figure. The possibility of an additional spark plug similar to spark plug 9 is schematically indicated in dash and dot lines in FIGS. 1 and 3, where the additional fourth spark plug is shown in dash and dot lines and designated by reference numeral 9'. As can be seen from these figures, spark plug 9' is also arranged in the area of the hot arc along the center line 7 in a manner similar to spark plug 9.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A rotary piston internal combustion engine of trochoidal construction with a rotating piston which slides along the running surface of a casing, and which includes several spark plug means at the running surface of the casing, characterized in that at least two spark plug means are arranged adjacent one another in the axial direction of the casing which are operable under all engine operating conditions, and in that the longitudinal axes of the spark plug means—as viewed in a plane containing the axes of said at least two spark plug means—form an acute angle with a line in said plane perpendicular to the engine axis and intersect at an acute angle inside of the casing within the space formed therein for the piston whereby the engine efficiency is improved.

2. A rotary piston internal combustion engine according to claim 1, characterized in that additionally at least one spark plug means is arranged downstream of said minor axis in the direction of rotation of the piston in the relatively hot arc.

3. A rotary piston internal combustion engine according to claim 2, characterized in that several spark plug means are arranged downstream of said minor axis in the relatively hot arc.

4. A rotary piston internal combustion engine according to claim 3, characterized in that each additional spark plug means is arranged substantially in the center of the running surface of the casing.

5. A rotary piston internal combustion engine according to claim 4, characterized in that said additional spark plug means are arranged disposed one behind the other.

6. A rotary piston internal combustion engine according to claim 5, characterized in that each additional spark plug means is arranged at an acute angle to the running surface of the casing—as viewed in the axial direction of the engine—in such a manner that the longitudinal axis is inclined generally opposite the direction of rotation of the piston.

7. A rotary piston internal combustion engine according to claim 2, characterized in that each additional spark plug means is arranged substantially in the center of the running surface of the casing.

8. A rotary piston internal combustion engine according to claim 7, characterized in that each additional spark plug means is arranged at an acute angle to the running surface of the casing—as viewed in the axial direction of the engine—in such a manner that the longitudinal axis is inclined generally opposite the direction of rotation of the piston.

9. A rotary piston internal combustion engine according to claim 1, characterized in that the spark plug means are arranged at an acute angle to the running surface of the casing—as viewed in the axial direction of the engine—so that the longitudinal axes thereof are inclined generally in the direction of rotation of the piston.

10. A rotary piston internal combustion engine of trochoidal construction with a rotating piston which slides along the running surface of a casing, and which includes several spark plug means at the running surface of the casing, characterized in that at least two spark plug means are arranged adjacent one another in the axial direction of the casing within the relatively cold arc which are operable simultaneously under all engine operating conditions, and in that at least one spark plug means is arranged downstream of said minor axis in the direction of the rotation of the piston in the relatively hot arc thereby resulting in a gain in the average effective pressure, in a decrease in the specific fuel consumption and in an improvement in engine efficiency.

11. A rotary piston internal combustion engine according to claim 10, characterized in that several spark plug means are arranged downstream of said minor axis in the relatively hot arc.

12. A rotary piston internal combustion engine according to claim 10, characterized in that each additional spark plug means is arranged substantially in the center of the running surface of the casing.

13. A rotary piston internal combustion engine according to claim 10, characterized in that each additional spark plug means is arranged at an acute angle to the running surface of the casing—as viewed in the axial direction of the engine—in such a manner that the longitudinal axis is inclined generally opposite the direction of rotation of the piston.

* * * * *